United States Patent [19]

Marshall, Jr. et al.

[11] Patent Number: 5,106,421

[45] Date of Patent: * Apr. 21, 1992

[54] MINERAL DYE PIGMENTS

[75] Inventors: Carl J. Marshall, Jr.; Albert C. Kunkle, both of Mason, Ga.

[73] Assignee: J. M. Huber Corporation, Rumson, N.J.

[*] Notice: The portion of the term of this patent subsequent to Apr. 21, 2009 has been disclaimed.

[21] Appl. No.: 427,340

[22] Filed: Oct. 27, 1989

[51] Int. Cl.$^5$ .................. C08K 5/00; C04B 14/10; C09C 1/02

[52] U.S. Cl. .................... 406/499; 106/417; 106/468; 106/483; 106/487

[58] Field of Search ............. 106/417, 468, 483, 487, 106/499

[56] References Cited

U.S. PATENT DOCUMENTS

| | | | |
|---|---|---|---|
| 3,545,909 | 12/1970 | Gagliardi | 8/523 |
| 3,834,924 | 9/1974 | Grillo | 106/490 |
| 3,950,180 | 4/1976 | Kato | 106/468 |
| 4,084,983 | 4/1978 | Bernhard et al. | 106/417 |
| 4,444,592 | 4/1984 | Ludwig | 106/23 |
| 4,543,128 | 9/1985 | Troesch et al. | 106/214 |
| 4,566,909 | 6/1986 | Nakatani et al. | 127/33 |
| 4,609,404 | 9/1986 | Marraccini et al. | 106/417 |
| 4,655,843 | 4/1987 | Marraccini et al. | 106/483 |
| 4,773,936 | 9/1988 | Clark et al. | 106/499 |

OTHER PUBLICATIONS

Juzu et al., *Chemical Abstracts*, 84: 181752 (1975).

*Primary Examiner*—William R. Dixon, Jr.
*Assistant Examiner*—Helene Klemanski
*Attorney, Agent, or Firm*—Harold H. Flanders; Alec H. Horn; Robert L. Price

[57] ABSTRACT

A mineral dye coloring pigment has been developed which includes a water-soluble organic dye which has been insolubilized or "fixed" onto a mineral pigment substrate by means of a cationic or anionic chemical compound. Also, a method for producing the mineral dye pigment and products containing the mineral dye pigment have been developed.

13 Claims, No Drawings

MINERAL DYE PIGMENTS

TECHNICAL FIELD

This invention relates to water-soluble organic dyes which have been insolubilized or "fixed" onto various mineral pigment substrates to thereby form mineral dye pigments. The mineral dye pigments are designed to replace presently used inorganic or organic dye pigments in many different applications including plastics, rubber, paint, printing inks, and paper.

BACKGROUND MATERIAL INFORMATION

Historically inorganic pigments, such as hydrated or anhydrous siliceous, metal silicates, sodium alumino silicates, hydrated aluminum silicates, e.g., clays, have found increasing uses in many industries. For example, such pigments are employed in paper coating compositions, as fillers for paper, paints, inks, etc., and as reinforcing pigments or fillers in elastomers and other polymeric materials. In addition to being used as fillers, inorganic pigments are often dyed or colored and used as color-imparting fillers in papers, paints, inks, etc. and as reinforcing pigments or fillers in elastomers and other polymetric materials.

In the process of dying or otherwise coloring pigments it is important to insolubilize or otherwise fix dyes onto the pigment particles. In this regard, it is often necessary to treat pigment particles in such a manner so as to improve the affinity of the pigment particles to the dyestuffs utilized.

Several methods of improving the affinity of various pigment particles to dyestuffs have been reported. U.S. Pat. No. 3,834,924 to Grillo teaches a process for manufacturing surface modified inorganic pigments. The process according to this patent includes adding amino organosilanes to an aqueous dispersion of an inorganic pigment whereby the inorganic pigment is contacted with the amino organo silane and reacts so that the surface of the inorganic pigment is modified in such a manner to increase the affinity for dyes.

U.S. Pat. No. 3,545,909 to Gagliardi teaches aminoalkyl silicone coloring assistances that may be applied in the form of a pre-treatment to condition inorganic pigment substrates for a subsequent coloring operation. This pre-treatment with the aminoalkyl silicone coloring assistance induces dyable sites onto normally non-affinitive materials so that they may accept conventional anionic type organic dye stuffs.

U.S. Pat. No. 4,084,983 to Bernhard et al teaches a process for producing colored lustrous pigments in which a firmly adhering coating of aluminum hydroxide is first applied to pigment substrates, the aluminum ions contained in the coating are then reacted in order to form a firmly adhering dyestuff layer. In this manner the substrate is coated with a starting material which is convertible into a colored layer.

U.S. Pat. No. 4,543,128 to Troesche et al teaches a process for dying inorganic pigments that can be used as fillers. According to this patent pigments are dyed with polycationic dyestuffs in a process that involves providing a colored composition of an aqueous paste for dispersion of the white pigment with a water-soluble polycationic dye stuff. An optional, conventional, fixing agent may be used in this process.

U.S. Pat. No. 4,566,908 to Nakatani et al teaches a process for producing an azoic pigment including a silica core with a coating of amino or polyazoic dye chemically bound to the surface of the silica core through an amino silane coupling agent.

While previous efforts had focused on various methods to fix diverse dyestuffs onto selective substrates, there is a long felt need for developing methods whereby safer organic dyes can be fixed onto pigment substrates and replace currently used cadmium and chromium red and yellow pigments which pose potential health problems both in the processing and use. In this regard, solvent dyes have been developed to overcome health concerns associated with cadmium and chromium red and yellow pigments in many rubber and plastics applications, however, solvent dyes are generally associated with disadvantages in that they are usually expensive, often hard to disperse, and sometimes degrade the rubber and plastic materials into which they are incorporated.

Water-soluble, organic dyes have the potential of addressing the problems of both inorganic pigments and solvent dyes in many applications. Nevertheless, methods for insolubilizing or fixing water-soluble, organic dyes, particularly dyes that can be used to replace currently used cadmium and chromium red and yellow pigments are lacking. The present invention provides a method for coloring pigment substrates which is an improvement over prior known methods.

DISCLOSURE OF THE INVENTION

It is one object of the present invention to provide a method for insolubilizing or fixing water-soluble organic dyes onto various pigment substrates by means of cationic or anionic chemical compounds.

It is a further object of the present invention to provide mineral dye pigments that are designed to replace presently used inorganic or organic dye pigments in many different applications including plastics, rubber, paint, printing inks and paper.

A still further object of the present is to provide mineral dye pigments which can be used to replace currently used cadmium and chromium red and yellow pigments, thereby avoiding health problems associated with cadmium and chromium pigment materials.

A still further object of the present invention is to provide mineral dye pigments that can be utilized as reinforcing pigments to replace many organic pigments which were found to be deleterious to the physical properties of materials such as rubbers and plastics.

A still further object of the present invention is to provide for mineral dye pigments which have better handling and clean up properties than previously devised organic or inorganic pigments.

An even further object of the present invention is to provide for mineral dye pigments that function as dye extenders whereby less actual dye is required for proper coloration.

Other objects and advantages of the present invention will become apparent as the description proceeds.

According to the invention, there is provided a coloring pigment useful for coloring or tinting inks, paints, plastics and rubber, which pigment comprises a mineral dye pigment wherein a water-soluble organic dye has been insolubilized or fixed on to a mineral pigment substrate by means of a cationic or anionic chemical compound.

The present invention also provides a method for preparation of mineral dye pigments useful for coloring or tinting inks, paints, plastics and rubber which involves reacting a water-soluble organic dye in the presence of a mineral pigment with a cationic or anionic chemical fixative, the reaction being carried out in the slurry form in which the cationic or anionic chemical fixative is titrated to a determined end point. After formation, the resulting mineral dye pigment is recovered from the dye-mineral slurry by a filtering process.

Also provided by the present invention are colored or tinted printing inks, paints, plastics and rubber compositions containing color pigments which comprise water-soluble organic dyes which are unsolubilized or fixed on to various mineral pigment substrates by means of cationic or anionic chemical compounds.

BEST MODE FOR CARRYING OUT THE INVENTION

The present invention relates to a mineral dye pigment which is useful for coloring or tinting various minerals including inks, paints, plastics and rubber. This mineral dye pigment is the reaction product of a water-soluble organic dye and a mineral pigment which have been mixed together and titrated with a cationic or anionic chemical fixative to a determined end point at which the water-soluble organic dye is insolubilized or fixed onto the mineral pigment substrate. The mineral dye pigments produced by this reaction are characterized by unique physical and chemical characteristics.

Mineral dye pigments produced in accordance with the present invention provide reinforcing characteristics which enhance the physical properties of materials to which they are incorporated, such as rubbers and plastics. This enhancing of physical characteristics is an improvement over many previous organic pigments which were found to be deleterious to the physical properties of materials such as rubber and plastics.

These mineral dye pigments also demonstrate better handling and cleanup properties than most organic and inorganic pigments thereby enabling lower production cost and thus affording the mineral dye pigments of the present invention economical and commercial advantages over previous organic and inorganic pigments.

It has been found that the mineral dye pigments of the present invention act as dye extenders whereby less actual dye is required for equal coloration. In this regard the mineral dye pigments have superior coloring strength over previous organic and inorganic pigments.

Finally, the mineral dye pigments of the present invention have been found to be superior replacements for organic dyestuff which currently incorporate cadmium and chromium as color pigments which have been determined to pose substantial health problems both in processing and in final product use.

The mineral dye pigments according to the present invention can be used in any application wherein coloring or tinting of a finished material is desired. Inks, paints, plastics and rubber are examples of major systems in which the new mineral dye pigments can be used.

Any number of reaction routes can be utilized to produce the present mineral dye pigments. For example, water-soluble organic dyes can be combined with the mineral substrate materials and then subsequently insolubilized or fixed onto the substrate materials by reacting the dye-mineral substrate mixture with appropriate cationic or anionic chemical compounds. In other instances the water-soluble organic dye can be dissolved in water into which the mineral pigment substrates are subsequently added in a dry or slurry form.

The cationic or anionic chemical fixative is then titrated into the dye-mineral pigment mixture to a determined end point so as to unsolubilize or fix the dye onto the mineral pigment, thereby forming the mineral dye pigments of the present invention.

Water-soluble organic dyes found to be useful for purposes of the present invention include acid direct and reactant dyes having acid functionality, such as dyes having sulfonic and/or carboxoic groups associated therewith. In addition, cationic or basic dyes have been found to be useful for the purposes of the present invention, particularly those having quaternary nitrogen functionality, although these dyes may sometimes contain positively charged sulfur or oxygen functionality as well. In all, as exemplified by the examples set forth herebelow, the present invention has been found to be applicable for insolubilizing or fixing all types of water-soluble dyes. Additionally, it has been discovered that the present invention is useful in fixing multiple dye systems in which two or more dyes are combined to produce diverse colored mineral dye pigments.

According to the present invention the water-soluble organic dyes have been made insolubilized or fixed on to various mineral pigment substrates. Mineral pigment substrates found to be particularly useful for purposes of the present invention include kaolins, calcined clays, synthetic alkali metal alumino-silicates (SAMS), micas and alumina trihydrate (ATH). The synthetic alkali metal alumino-silicates (SAMS) used in connection with the present invention comprise a novel and unique synthetic alkali metal alumina-silicates that are produced by the hydrothermal reaction between kaolin clay and alkali metal silicates according to the procedures set forth in U.S. patent application Ser. No. 875,021, filed June 17, 1986, and U.S. patent application Ser. No. 116,805, filed Nov. 3, 1987, the specifications of which are incorporated herein by reference.

As discussed above and as more particularly set forth in the examples which follow, the chemical fixatives used in insolubilizing or fixing the dye materials onto the pigment substrates include both cationic and anionic compounds, particularly cationic and anionic polymers.

As illustrated in the examples which follow, cationic fixatives were found to be particularly useful in insolubilizing or fixing acid and direct water-soluble dyes. Particular cationic fixatives found useful for purposes of the present invention include resinous, polymers, methylol amide polymers, and quaternary ammonium polymers. The quaternary ammonium polymers include both mono-, di and polyquaternary ammonium polymers. Examples of polyquaternary ammonium polymers include polyamide polymers and polyamine polymers.

Anionic chemical fixatives were found to be particularly useful in insolubilizing or fixing basic type water-soluble dyes. Exemplary anionic fixatives include resorcinol formaldehyde, a partial ester of styrene maleic anhydride, a monoammonium salt of a styrene maleic anhydride and polyacrylates.

As discussed above, the process for producing the mineral dye pigment according to the present invention involves reacting a mineral pigment with a water-soluble organic dye in the presence of an ionic chemical fixative whereby said water-soluble dye is insolubilized or fixed onto the material pigment substrate by means of said ionic chemical fixative. Various manners of combining the mineral pigment, water-soluble organic dye and the ionic chemical fixative are foreseen according to the present invention. One particular method found to be useful is to initially combine the mineral pigment and the water-soluble organic dye in the dry state to which an amount of water is added to wet out and dissolve the dye. After an additional mixing time, the dye/mineral is dried to produce a dye/mineral composition which is redissolved in an aqueous solution to which the ionic chemical fixative is added to thereby react and fix the water-soluble dye onto the mineral pigment to form the mineral dye pigment.

In a process according to another embodiment of the present invention a predetermined quantity of the water-soluble organic dye is added to a sufficient amount of demineralized water to dissolve the water-soluble dye so as to form a dye solution. The mineral pigment is then added to the dye solution to form a dye/mineral mixture. The ionic chemical fixative is then titrated into the dye/mineral mixture to a determined end point at which the water-soluble organic dye is fixed onto the mineral pigment thereby forming a dye/mineral slurry. Finally, the dye/mineral slurry is pH adjusted to produce a final mineral dye pigment.

Additional conventional steps that follow the formation of the mineral dye pigment include filtering, drying and milling the mineral dye pigment as required.

According to the above procedure in which a predetermined quantity of the water-soluble dye is added to a sufficient amount of demineralized water to dissolve the water-soluble dye to form the solution, it has been determined that a preferred solution should contain up to about 10% by weight of the water-soluble organic dye, and more preferably, between about 1.0 and 2.0% by weight of the water-soluble organic dye.

The titration of the ionic chemical fixative according to the above discussed process proceeds to an end point which is determined by spot testing the dye/mineral on filter paper until no dye is found to bleed from the dye/mineral mixture.

In the above discussed process the pH is suitably adjusted by the addition of an acid, such as acetic or sulfuric acid, or by the addition of aluminum sulfate (alum). A suitable pH which has been found to be effective for purposes of properly fixing the water-soluble organic dye onto the mineral pigment has been determined to be generally between about 4.0 and 6.0.

As discussed in detail above, the mineral dye pigments of the present invention are the reaction products of a mineral pigment, a water-soluble organic dye and an ionic chemical fixative, whereby the water-soluble dye is fixed onto the mineral pigment by the ionic chemical fixative.

Suitable mineral substrates determined to be useful for purposes of the present invention include natural clays, calcined clays, synthetic alkali metal alumino-silicates (SAMS), micas and alumina trihydrate (ATH). Preferred natural and calcined clays include kaolins and hectorites. Preferred materials are synthetic alkali metal alumino-silicates include those prepared from a Hydragloss ® clay, those prepared from an Omnifil ® clay and those prepared from a Hydraprint ® clay.

In accordance with the present invention it has been determined that acid, basic, direct and reactive dyes can all be successfully insolubilized or fixed onto various mineral substrates.

The ionic chemical fixatives found useful for purposes of the present invention include both cationic and anionic compounds. In particular cationic and anionic polymers were used to fix several dyes onto a variety of mineral substrates.

Particular cationic fixatives are quaternary ammonium compounds, including mono-, di- and polyquaternary ammonium compounds. Exemplary polyquaternary ammonium compounds include polyamide polymers and polyamine polymers. Other exemplary cationic fixatives include resinous polymers and methyl amine polymers.

Particular anionic fixatives found to be useful for purposes of the present invention include resorcinol formaldehyde, a partial ester of styrene maleic anhydride, a monoammonium salt of styrene maleic anhydride and polyacrylates.

The process for producing the mineral dye pigments, as discussed in detail above, involves reacting a mineral pigment with a water-soluble organic dye in the presence of an ionic chemical fixative whereby the water-soluble dye is fixed onto the mineral substrate by means of the ionic chemical fixative.

In one embodiment, the process involves first dry mixing the mineral substrate and the water-soluble organic dye. The dye mixture is next dissolved in an aqueous solution which is subsequently dried to leave a dye/mineral composition. The dye/mineral composition is redissolved in an aqueous solution to which the ionic chemical fixative is added to produce the mineral dye pigment which is subsequently filtered, dried and milled to a fine powder.

In another embodiment a predetermined quantity of water-soluble organic dye is added to a sufficient amount of demineralized water to form a dye solution in which the water-soluble dye comprises up to about 10% by weight of the solution and preferably between about 1.0 to about 2.0% by weight of the solution.

The mineral substrate is next added to the dye solution to form a dye/mineral mixture. The ionic chemical fixative is next titrated into the dye/mineral mixture to an end point at which the water-soluble organic dye is fixed onto the mineral substrate, thereby forming a dye/mineral slurry.

Finally, the pH of the dye/mineral slurry is adjusted between about 4–6 to produce the mineral dye pigment which is collected, dried and milled to a fine powder.

The mineral dye pigment produced in accordance has been found to be useful as a coloring pigment in rubber and plastic compositions.

Initially, for purposes of the present invention, 10 water-soluble red dyes of varying types color shades were evaluated on synthetic alkali metal alumino-silicate prepared from a hydrogloss clay (H-SAMS) as a carrier to replace currently used inorganic clay pigments. Each red dye, which is commercially available from Samdos Chemicals is listed with its Samdos name, Color Index Numbered Dye it most approximates, and Dye Type in Table I below.

TABLE I

| SANDOZ RED DYES | | |
|---|---|---|
| Dye Name | Color Index Synonym | Dye Type |
| Croceine Scarlet MOO | Acid Red 73 | Disazo |
| Lanasyn Red 2GLN | Acid Red 404 | Chromium/Azo |
| Cartasol Red K2B | Basic Red 44, 111 | Azo |
| Sandocryl Red BBL | Basic Red 22 | Azo |
| Sandocryl Red BRL | Basic Red 104 | Azo |
| Sandocryl Brilliant Red B4G | Basic Red 14 | Cyanine |
| Sandocryl Red B6B | Basic Violet 16 | Methine |

TABLE I-continued

SANDOZ RED DYES

| Dye Name | Color Index Synonym | Dye Type |
|---|---|---|
| Cartasol Red 2GF | Direct Red 239 | Disazo |
| Pyrazol Fast Red 7BSW | Direct Red 80 | Polyazo |
| Drimarene Brilliant Red X2B | Reactive Red 56 | Azo |

EXAMPLE 1

In this example the dyes listed in Table I were mixed with H-SAMS at a 10% dye level (10% dye/90% H-SAMS, by weight) using an absolute minimum amount of water to dissolve the dye. The purpose of this example was to determine whether any of the dyes could be insolubilized on H-SAMS without any additional fixative material. It was found that no dye was insolubilized directly onto the H-SAMS product. Varying the pH of the dye/SAMS slurry by addition of acid or base showed promise for reducing the dye solubility in water. However, adjusting pH alone did not enable acceptable insolubility.

Once it was determined by Example 1 that none of the dyes alone were insolubilized on the H-SAMS, various fixatives were evaluated in accordance with the examples that follow.

In order to evaluate the dye/H-SAMS systems with fixatives, it was decided to put the dye on the SAMS material first and then attempt to insolubilize the dyes with appropriate fixatives. Each dye was first blended with H-SAMS in a dry state at a 25% dye/75% SAMS ratio (by weight) in a laboratory Patterson-Kelly (PK) blender. An amount of water equal to the weight of SAMS was added slowly by funnel into the PK blender to wet out and dissolve the dye. After 30 minutes mixing time, the dye/H-SAMS material was dried in an oven at 200° C. for four hours. After milling, the samples were then ready for evaluation with various fixatives.

EXAMPLE 2

In this example varying levels of Sandofix fixatives, SWE (a cationic resinous polymer) and WE (a cationic methylol amide polymer) were added to a system of 10 grams of the 25% dye/75% H-SAMS material in 20 grams water. Acid (HCl, H$_2$SO$_4$) or base (NaOH, NH$_4$OH) was added to vary the pH of each dye system to determine the best fixing system for each dye material. After thoroughly mixing, the slurry was filtered through a fairly course filter paper in a Buchner funnel under vacuum. The results of this example are illustrated in Table II below.

insolubilized. There was a small amount of dye in each initial filtrate, except for the Cartaso Red K2B/H-SAMS. Subsequent work with the dyes indicated that the light brown filtrate color was due to excess SWE fixative and was not necessarily an indication of the solubility of the fixed dye.

EXAMPLE 3

This example two 2 diquaternary ammonium compounds, Ethodouquad R-15/50, a proprietary diquaternary ammonium salt (molecular weight: 660) from Armak Chemicals (Akzo Chemie America), and Duoquad T-50, (molecular weight: 480) also from Armak Chemicals were tested as fixatives. Initially the two duoquads were used at full strength, which is 50% active. Later, a 10% active aqueous solution was used for greater ease in determining the best levels from floccing of the dye/pigment.

Most of the Sandoz red dyes that were fairly well insolubilized with the SWE or WE fixatives and H-SAMS worked much better with the Ethoduoquad R/15 as a fixative. For example, Ethoduoquad R/15 fixed, 25% Croceine Scarlet MOO on H-SAMS using R/15 at 1.15 times the dye level, yielded a virtually clear filtrate and a dye pigment that did not bleed. Table III below which illustrates the results of this example shows that the amount of WE fixative needed to fix the same very soluble dye was 1.85 times the dye level, yielding a light pink filtrate and a dye pigment that bled very badly when wetted.

TABLE III

FIXATION OF SANDOZ DYES ON HP-SAMS WITH ETHODUOQUAD R/15

| D Cartasol Red 2GF | 104.4 | 17.80 | Light Medium Orange |
| D Pyrazol Fast Red 7BSW | 53.3 | 9.09 | Pink Tint |
| D Cartasol R3BF Liquid | 43.75 | 7.46 | Pink Tint |
| A Croceine Scarlet MOO | 74.7* | 25.45* | Light Pink Orange |
| A Lanasyn Red 2GL | 31.1 | 5.30 | Light Peach |

*Duoquad T-50
NOTE:
All dye systems are 10% dye/90% HP-SAMS.
Key: D-direct dye; Rx-reactive dye; A-acid dye

EXAMPLE 4

In this example several SAMS pigments were investigated as possible bases for dye pigment materials. SAMS pigments evaluated were as follows:

H-SAMS (commercial product prepared from a hydragloss clay)

O-SAMS (commercial product prepared from a omnifil clay)

O-SAMS at 0.3 b/c ratio (413-11)

HP-SAMS (prepared from a hydraprint clay) at 0.25

TABLE II

RED DYES FIXED ON H-SAMS WITH SWE OR WE

| DYE | DYE LEVEL, % | FIXATIVE, PERCENT OF DYE WE | FIXATIVE, PERCENT OF DYE SWE | SLURRY pH | SOLID COLOR | FILTRATE COLOR |
|---|---|---|---|---|---|---|
| CARTASOL RED 2GF | 25 | 100 | — | 8.5 | WINE RED | LIGHT PINK |
| CROCEINE SCARLET MOO | 25 | 185 | — | 8.35 | BRIGHT RED | LIGHT RED-ORANGE |
| CARTASOL RED K2B | 25 | — | 15 | 10.2 | WINE RED | LIGHT BROWN |
| FYRAZOL FAST RED 7BSW | 25 | — | 40 | 6.0 | MAGENTA | MEDIUM YELLOW |
| DRIMARENE BRILLIANT RED X2B | 25 | — | 75 | 6.0 | PURPLE | LIGHT PINK |

As seen from Table II above, the dyes on H-SAMS were fairly well fixed, although obviously not totally b/c ratio (391-52)

HP-SAMS at 0.50 b/c ratio (391-53)

The above SAMS pigments were evaluated with Croceine Scarlet MOO dye at 25% dye level and fixed with Ethoduoquad R/15. Although none of the dyes was completely fixed on the pigments, the two HP-SAMS (SAMS from hydraprint clay) products yielded the most uniform dye/pigment colors and the most intense red colors. The HP-SAMS at 0.50 b/c ratio (391-53) seemed to be slightly better as a base for the dye than the HP-SAMS at 0.25 b/c ratio. The HP-SAMS at 0.50 b/c ratio product was used for subsequent dye fixation work.

EXAMPLE 5

For this example a number of yellow, orange, blue and two additional red dyes were evaluated for their ability to be fixed in mineral pigments. These additional dyes, which are commercial available from Sandoz Chemical are listed in Table IV below which also lists their Color Index Numbers and Dye Types.

In this example the new dyes were slurried with HP-SAMS at a 10% dye level (by weight) and fixed with a solution of 10% Ethoduoquad R/15. The results of this example are given in Table V below.

TABLE IV
DYES OF VARIOUS COLORS FROM SANDOZ

| Yellow Dyes | Color Index Synonym | Dye Type |
|---|---|---|
| Cartasol Golden Yellow AF | Direct Yellow 150 | Trisazo |
| Cartasol Yellow KGL Liquid | Basic Yellow 94 | Azo |
| Pyrazol Fast Yellow AF | Direct Yellow 150 | Azo |
| Pyrazol Fast Yellow RF | Direct Yellow 133 | Azo |
| Drimarene Brilliant Yellow X4GL | Reactive Yellow 58 | Monoazo |
| Drimarene Brrlliant Yellow R/K-2GL | Reactive Yellow 111 | Azo |
| Orange Dyes | | |
| Cartasol Brilliant Orange 2RF | Direct Orange 118 | Azo |
| Cartasol Brilliant Orange 2RF Liquid | Direct Orange 118 | Disazo |
| Drimarene Brilliant Orange K3R | Reactive Orange 64 | Azo |
| Red Dyes | | |
| Carta Bordeaux 7B | Direct Red 16 | Azo |
| Cartasol Red 3BF Liquid | Direct Red 253 | Azo |
| Blue Dyes | | |
| Cartasol Blue KRL Liquid | Basic Blue 154 | Azo |
| Carta Brilliant Blue PTS | Acid Blue 283 | Phthalacyanine |
| Carta Brilliant Blue PTS Liquid | Acid Blue 283 | Phthalacyanine |
| Pyrazol Fast Blue FGL | Direct Blue 90 | Metal/Azo |
| Pyrazol Fast Blue 2GLN | Direct Blue 77 | Metal/Azo |
| Cartasol Turquoise KGL Liquid | Direct Blue 262 | Phthalacyanine |
| Drimarene Turquoise K/R-2B | Reactive Blue 116 | Phthalacyanine |
| Drimarene Navy K2B | Reactive Blue 193 | Azo |

TABLE V
FIXATION OF SANDOZ DYES ON HP-SAMS WITH ETHODUOQUAD R/15

| Dye Type | Yellow Dyes | Ethoduoquad R/15 % of Dye | meq | Filtrate Color |
|---|---|---|---|---|
| D | Cartasol Golden Yellow AF | 133.3 | 22.73 | Faint Yellow |
| D | Pyrazol Fast Yellow AF | 137.8 | 23.48 | Very Light Yellow |
| D | Pyrazol Fast Yellow RF | 126.7 | 21.59 | Light Yellow |
| Rx | Drimarene Brilliant Yellow K2GL | 88.9 | 15.15 | Very Faint Yellow |
| | Orange Dyes | | | |
| D | Cartasol Brilliant Orange 2RF | 40.0 | 6.82 | Light Orange |
| D | Cartasol Brilliant Orange 2RF Liquid | 33.3 | 5.86 | Very Faint Yellow |
| | Blue Dyes | | | |
| A | Carta Brilliant Blue PTS | 173.3 | 29.55 | Clear |
| A | Carta Brilliant Blue PTS Liquid | 34.1 | 5.82 | Clear |
| D | Pyrazol Fast Blue FGL | 25.2 | 4.29 | Pink Tint |
| D | Pyrazol Fast Blue 2GLN | 23.7 | 4.05 | Light Purple |
| Rx | Drimarene Turquoise K/R-2B | 88.9 | 15.15 | Light Blue Tint |
| Rx | Drimarene Navy K2B (5%) | 139.4 | 11.09 | Pink Tint |
| | Red Dyes | | | |
| D | Cartasol Red 2G | 104.4 | 17.80 | Light Medium Orange |
| D | Pyrazol Fast Red 7BSW | 53.3 | 9.09 | Pink Tint |
| D | Cartasol R3BF Liquid | 43.75 | 7.46 | Pink Tint |
| A | Croceine Scarlet MOO | 74.7* | 25.45* | Light Pink Orange |
| A | Lanasyn Red 2GLN | 31.1 | 5.30 | Light Peach |

*Duoquad T-50
NOTE:
All dye systems are 10% dye/90% HP-SAMS.
Key: D-direct dye; Rx-reactive dye; A-acid dye Table V above shows that there was a wide range for the amount of Ethoduoquad R/15 needed to fix the various dyes. There is no particular pattern as to the type of dye (acid, direct, or reactive) and the amount of fixative required. Pyrazol Fast Blue 2GLN (direct dye) required the least fixative; Carta Brilliant Blue PTS (acid dye) required the most fixative. Most of the dyes, as illustrated in Table V were well fixed on the HP-SAMS as indicated by the clear or faint color of a slurred filtrate.

Those dyes that were not successfully fixed or flocced by Ethoduoquad R/15 on HP-SAMS are listed Table VI below.

TABLE VI

SANDOZ DYES NOT FIXED BY ETHODUOQUAD R/15

| | Yellow Dyes |
|---|---|
| Rx | Drimarene Brilliant Yellow X4GL |
| B | Cartasol Yellow KGL |
| | Orange Dye |
| Rx | Drimarene Brilliant Orange K3R |
| | Red Dyes |
| B | Cartasol Red K2B |
| Rx | Drimarene Brilliant Red X2B |
| D | Cartasol Red 3BF |
| D | Carta Bordeau 7B |
| B | Sandocryl Red BBL |
| B | Sandocryl Red BRL |
| B | Sandocryl Red B6B |
| B | Sandocryl Brilliant Red B4G |
| | Blue Dyes |
| D | Cartasol Turquoise KGL Liquid |
| B | Cartasol Blue KRL |

KEY: B basic dye
D direct dye
Rx reactive dye

As can be seen from Table VI above, most of the unsuccessful dyes were basic dyes which would not be expected to react with the basic quaternary ammonium compounds. Three of these dyes were reactive dyes, while three were direct dyes (at least one was a copper complex). Thus, it can be seen that acid and direct dyes can be fixed with quaternary ammonium compounds.

EXAMPLE 6

In this example an attempt was made to produce green dyes on HP-SAMS by fixing an intense blue dye and an intense yellow dye in three ratios. Cartasol Golden Yellow AF and Carta Brilliant Blue PTS dyes were fixed at 3:1, 1:1, and 1:3 weight ratios at a total of 10% level on HP-SAMS. The three dye combinations were successfully fixed on HP-SAMS, yielding three shades of green-dark yellow-green for the 3:1 yellow:blue, a jade green for the 1:1 combination, and a dark green for the 1:3 combination (yellow:blue). The results of this example are illustrated in Table VII below.

TABLE VII

GREEN DYES FROM YELLOW/BLUE DYE COMBINATIONS ON HP-SAMS

| | A | B | C |
|---|---|---|---|
| Cartasol Golden Yellow AF | 7.5 | 5.0 | 2.5 |
| Carta Brilliant Blue PTS | 2.5 | 5.0 | 7.5 |
| Ethoduoquad R/15, % of dye | 142.2 | 153.3 | 164.4 |
| , meq | 24.24 | 26.14 | 28.03 |
| Filtrate Color | Very Faint Green | Clear | Clear |
| Solid | Dark Yellow Green | Jade Green | Very Dark Green |

NOTE:
All dyes are 10% total dye/90% HP-SAMS.

Interestingly, the amount of Ethoduoquad R/15 required (meq or percent of dye) to fix the 5.0% Golden Yellow AF/5.0% Brilliant Blue PTS combination was exactly halfway between the amount needed to fix 10% of each dye separately.

EXAMPLE 7

In the previous examples, most of the dye fixation work was done at 10% or 25% (by weight) dye levels. In this example the effect of varying the dye levels was investigated by fixing Cartasol Red 2GF (direct dye) at dye levels of 5% to 30% with Ethoduoquad R/15. The color of the dye/fixative/HP-SAMS pigments ranged from light orange red (5%) to fairly intense dark red (30%). The results obtained in this example are illustrated in Table VIII below.

TABLE VIII

FIXATION OF VARIOUS LEVELS OF CARTASOL RED 2GF ON HP-SAMS

| Cartasol Red 2GF, % | Ethoduoquad R/15 % of Dye | meq* | Solid Color | Filtrate Color |
|---|---|---|---|---|
| 5.0 | 80.0 | 5.40 | Orange Red (dull) | Pink Tint |
| 10.0 | 71.1 | 12.12 | Orange Red | Light Orange |
| 15.0 | 60.0 | 18.87 | Bright Red | Light-Medium Orange |
| 20.0 | 55.9 | 30.23 | Bright Red | Light-Medium Orange |
| 25.0 | 75.8 | 50.50 | Darker Bright Red | Light-Medium Orange |
| 30.0 | 54.8 | 72.57 | Dark Red | Light Orange |

*based on equivalent levels of HP-SAMS (20 grams).

In addition to the Cartasol Red 2GF dye used in the above example 7 Croceine Scarlet MOO 1.0% and 3.0% levels were fixed with 5.0 and 17.2 meg of Ethoduoquad, respectively, yielding orange colored pigments and clear filtrates. At 10% Croceine Scarlet MOO it was necessary to use 17.1 meg of Duoquad T to obtain an orange red pigment. At 25% Croceine Scarlet MOO 61.6 meg Ethoduoquad R/15 yielded a bright red pigment.

EXAMPLE 8

In this example various quaternary ammonium fixatives in addition to Ethoduoquads were tested for their effectiveness. For purposes of this example several mono- and diquaternary ammonium compounds were used to fix Pyrozol Fast Red 7BSW at 10% (by weight) dye level. The particular quaternary fixatives, the fixative level and the dye pigment results are given in Table IX below.

TABLE IX
VARIOUS QUATS AS FIXATIVES FOR PYRAZOL FAST RED 7BSW ON HP-SAMS

| Quat Fixative | % of Dye | Solid Color | Filtrate Color |
|---|---|---|---|
| Ethoduoquad R-15/50 | 66.7 | Magenta | Clear |
| Duoquad T-50 | 36.0 | Magenta | Faint Pink |
| DMHTB* | 40.0 | Dull Red | Light-Medium Red |
| Adogen 441 | 35.6 | Magenta | Faint Pink |
| Adoqen 462 | 48.0 | Dull Magenta | Very Light Orange |
| Armak 1028 | 66.7 | Very Dull Pink | Very Faint Pink |
| Variquat MC80 | 48.0 | Dull Orange | Clear |

*DMHTB - dimethyl hydrogenated tallow benzyl ammonium chloride.
NOTE:
All pigmnts are 10% dye/90% HP-SAMS.

In another experiment similar to that of Example 8 above, several polyquaternary ammonium compounds from Calloway Chemicals (Exxon) were used in an attempt to fix 10% (by weight) Croceine Scarlet MOO and 10% (by weight) Cartasol Red 2GF on HP-SAMS. The polyquats, Discol 716,780A (cationic polyamide polymers), and 792A (cationic polyamine polymer) prove to be a successful fixative for these dyes but did not prove to be any better than Sandofix SWE and Ethoduoquad R/15.

EXAMPLE 9

In this example the best five red dyes originally fixed on H-SAMS at a 25% dye level with SWE or WE fixatives were evaluated in Natsyn rubber (3 and 6 phr) and polypropylene (0.4, 0.6, and 0.8%) to determine if such dyes could replace inorganic colored pigments in these and similar materials. The results of this example show that there is no degradation of physical properties from the addition of the dye/SAMS materials to either the rubber or the polypropylene materials.

The colored rubber samples were tested in water (ambient temperature and 90° C.), ethylene glycol, and LVT oil from 1 to 2 weeks. All samples performed reasonably well. The Cartasol Red 2GF, Pyrazol Fast Red 7BSW and Drimarene Brilliant Red X2B dye pigments performed especially well in water and ethylene glycol. The Drimarene dye performed well in water, ethylene glycol in the oil.

The Cartasol Red 2GF, Pyrazol Fast Red 7BSW and Drimarene Brilliant Red X2B dye materials showed small improvements in the tensile and flextured properties for the filled polypropylene samples. Thus, the dye/SAMS products performed well as colorants for both rubber and plastics. These findings indicate that properly insolubilized dyes on H-SAMS and other SAMS products would perform better still in rubber and plastics.

In the following Examples 10 and 11 several water-soluble dyes commercially available from Chemical Process and Supply (CPS), of Dunkirk, New York, were tested with various fixatives to determine if they could insolubilized or fixed on to mineral substrates. These dyes are listed in Table X below.

TABLE X

| Acid Dyes | Basic Dyes |
|---|---|
| Scarlet 3R | Methylene Blue B |

TABLE X-continued

| Acid Dyes | Basic Dyes |
|---|---|
| Tartrazine Yellow | Methyl Violet |
|  | Auramine O |
|  | Rhodamine B |
|  | Victoria Blue |

EXAMPLE 10

In this example, the following polyquats were tried as fixatives for Tartrazine Yellow and Scarlet 3R when it was found that the SWE, WE, monoquat, and diquat fixatives did not insolubilize the dyes on HP-SAMS:
Mirapol A-15 (Miranol)
Discol 716 (Calloway Chemicals)
Discol 780A (Calloway Chemicals)
Discol 792A (Calloway Chemicals)

Good intense dye/HP-SAMS materials were produced at 10% and 25% (by weight) dye levels for Tartrazine Yellow with Discol 716, 10% (by weight) Tartrazine with Discol 780A, and 10% (by weight) Scarlet 3R with SWE fixative. However, the filtrate from each filtered slurry was far from being clear, indicating a fair amount of dye was not insolubilized. There was also some bleeding from the reslurried dried dye/HP-SAMS samples from soluble dye trapped in the HP-SAMS when dried. Thus none of the cationic fixatives tried was able to fully fix or insolubilize Tartrazine and Scarlet 3R dyes.

EXAMPLE 11

In this example several anionic polymers were evaluated for use as fixatives for the basic dyes previously listed in Table VIII. The only polymer that worked well to insolubilize the dyes was Penacolite R-2200, a resorcinol formaldehyde polymer from Koppers. However, the R-2200 polymer had a very red-brown color that would be expected to interfere with the dye/HP-SAMS shade. To reduce the R-2200, polymer (70% active to a workable 10% aqueous polymer activity, it was necessary to add ammonium hydroxide; otherwise, adding water to R-2200 resulted in an insoluble orange-colored mess. The color of the R-2200 became darker with time until it was a dull brown. Clear filtrates from dye/R-2200/HP-SAMS complexes became darker and darker brown upon standing. It was later determined that using R-2200 with methanol diluent and no ammonium hydroxide resulted in no fixation of the same dye that had been fixed with R-2200 containing ammonium hydroxide. Thus fixation was the result of both the resorcinol formaldehyde polymer and ammonium hydroxide.

Based on the findings of this example, a clear or lightly colored resorcinol formaldehyde or, more likely, a phenol formaldehyde, polymer would be a good fixative for dyes on HP-SAMS or clays.

Some success was obtained using Sartomer SMA-1440H, the monoammonium salt of styrene maleic anhydride with the same basic dyes from CPS.

The following dyes were reasonable fixed with the given fixatives at the given levels on HP-SAMS.

| Dye | Levels, % | Fixative |
|---|---|---|
| Auramine OW (yellow) | 10,25 | SMA-1440H |
| Rhodamine BH (red-violet) | 10,25 | R-2200 |
| Methylene Blue BH | 10,25 | R-2200 |
| Methyl Violet | 10,25 | R-2200 |

| Dye | Levels, % | Fixative |
|---|---|---|
| Victoria Blue | 10,25 | R-2200 |

All but Auramine/HP-SAMS had virtually water clear filtrates, indicating complete fixation of the dye on HP-SAMS. However, a considerable amount of fixative was required to produce good dye/HP-SAMS materials.

Although the invention has been described with reference to particular means, materials and embodiments, from the foregoing description, one skilled in the art can easily ascertain the essential characteristics of the present invention and various changes and modifications may be made to adapt the various usages and conditions without departing from the spirit and scope of the present invention as described in the claims that follow.

We claim:

1. A coloring pigment which comprises the reaction product of a mineral pigment, a water-soluble organic dye and a cationic polymer chemical fixative selected from the group consisting of resinous polymers and methylol amide polymers, whereby said water-soluble dye is fixed onto said mineral pigment by addition of said chemical fixative.

2. A process for producing a coloring pigment which comprises reacting a mineral pigment with a water-soluble organic dye in the presence of an ionic chemical fixative whereby said water-soluble dye is fixed onto said mineral pigment by means of said ionic chemical fixative, wherein:
   (a) said mineral pigment and said water-soluble organic dye are dry mixed;
   (b) said dry mixture of mineral pigment and water-soluble dye is dissolved in an aqueous solution to form an aqueous dispersion;
   (c) said aqueous dispersion is dried to form a dye/mineral composition;
   (d) the dye/mineral composition is milled and redissolved in an aqueous solution; and
   (e) said ionic chemical fixative is added to said redissolved dye/mineral to thereby react and fix said water-soluble dye onto said mineral pigment.

3. The process of claim 2, wherein said mineral pigments are selected from the group consisting of kaolins and hectorites.

4. The process of claim 2, wherein said ionic chemical fixative is selected from the group consisting of cationic resinous polymers and cationic methylol amide polymers.

5. The process of claim 2, wherein said ionic chemical fixative is selected from the group consisting of a resorcinol formaldehyde, a partial ester of styrene maleic anhydride, a monoammonium salt of styrene maleic anhydride and a polyacrylate.

6. A process for producing a coloring pigment which comprises reacting a mineral pigment with a water-soluble organic dye in the present of an ionic chemical fixative whereby said water-soluble dye is fixed onto said mineral pigment by means of said ionic chemical fixative, wherein:
   (a) a water-soluble organic dye is added to a sufficient amount of demineralized water to dissolve said water-soluble organic dye to form a dye solution;
   (b) said mineral pigment is added to said dye solution to form a dye/mineral mixture;
   (c) said ionic chemical fixative is titrated into said dye/mineral mixture to an end point at which said water-soluble organic dye is fixed onto said mineral pigment thereby forming a dye/mineral slurry;
   (d) said dye/mineral slurry is pH adjusted to produce said coloring pigment.

7. The process for producing a coloring pigment of claims 6, wherein said dye solution of step (a) comprises 1% to about 10% by weight of said water-soluble organic dye.

8. The process of claim 6, wherein said pH is adjusted to about 4 to 6 by adding an appropriate amount of one or more of acetic acid, sulfuric acid or alum.

9. The process of claim 6, wherein said mineral pigments are selected from the group consisting of kaolins and hectorites.

10. The process of claim 6, wherein said ionic chemical fixative is selected from the group consisting of cationic resinous polymers and cationic methylol amide polymers.

11. The process of claim 6, wherein said ionic chemical fixative is selected from the group consisting of a resorcinol formaldehyde, a partial ester of styrene maleic anhydride, a monoammonium salt of styrene maleic anhydride and a polyacrylate.

12. A rubber composition comprising a coloring pigment which coloring pigment comprises the reaction product of a mineral pigment, a water-soluble organic dye and a cationic polymer chemical fixative selected from the group consisting of resinous polymers and methylol amide polymers, whereby said water-soluble organic dye is fixed onto said mineral pigment by means of said chemical fixative.

13. A plastic composition comprising a coloring pigment which coloring pigment comprises the reaction product of a mineral pigment, a water-soluble organic dye and a cationic polymer chemical fixative selected from the group consisting of resinous polymers and methylol amide polymers, whereby said water-soluble organic dye is fixed onto said mineral pigment by means of said chemical fixative.

* * * * *